(No Model.) 3 Sheets—Sheet 1.

C. NELSON.
WAGON BOX.

No. 478,706. Patented July 12, 1892.

Witnesses:
G. B. Towles.
D. Mahoney

Inventor:
Charles Nelson
By Thomas P. Simpson Atty (No Model.) 3 Sheets—Sheet 2.
C. NELSON.
WAGON BOX.
No. 478,706. Patented July 12, 1892.
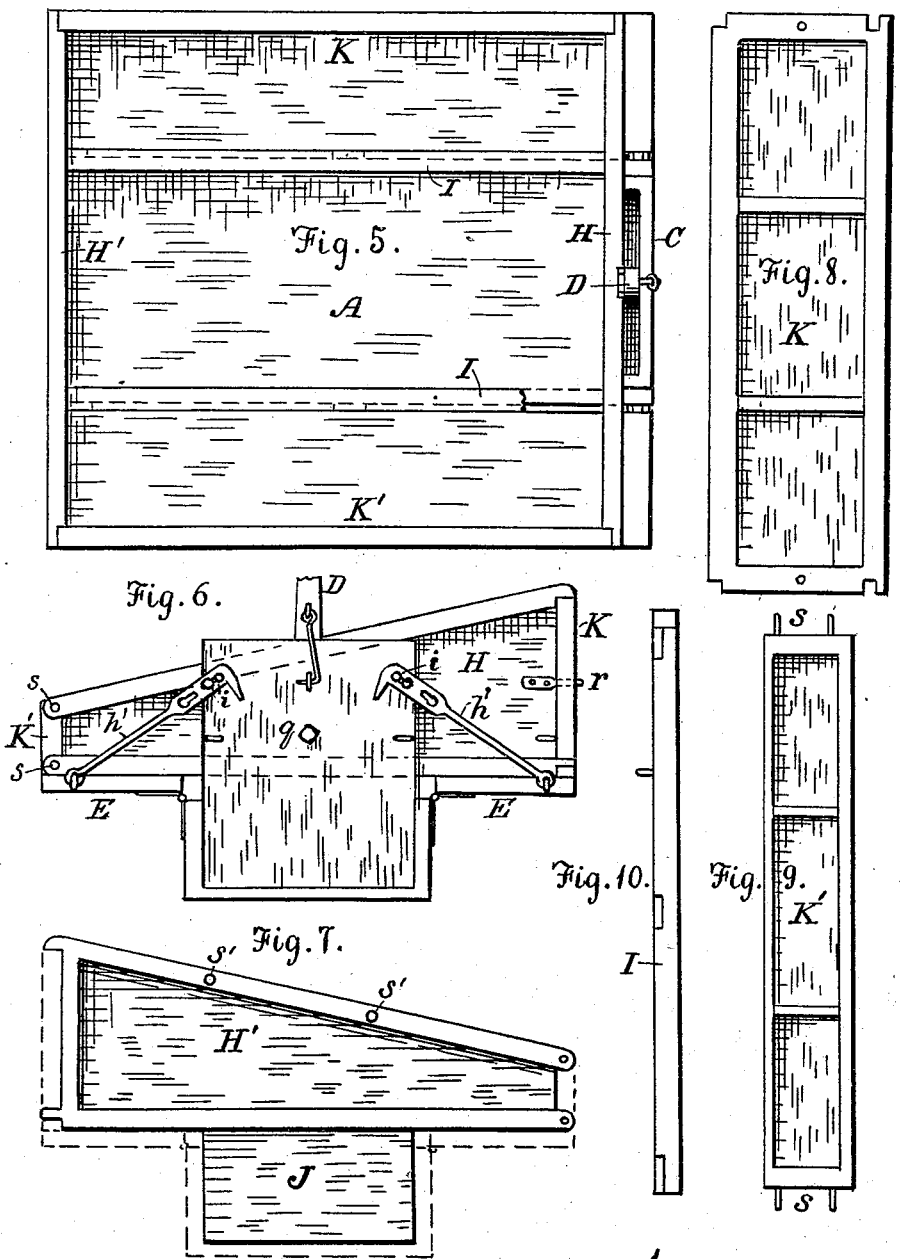
Witnesses:
G. B. Towles
D. Mahoney
Inventor:
Charles Nelson.
Per
Thomas P. Simpson,
Atty.

(No Model.)  3 Sheets—Sheet 3.

C. NELSON.
WAGON BOX.

No. 478,706.  Patented July 12, 1892.

Witnesses:
G. B. Towler
D. Mahoney

Inventor:
Charles Nelson
Per
Thomas P. Simpson
Atty

THE NORRIS PETERS CO., PHOTO-LITHO., WASHINGTON, D. C.

UNITED STATES PATENT OFFICE.

CHARLES NELSON, OF AXTELL, NEBRASKA.

WAGON-BOX.

SPECIFICATION forming part of Letters Patent No. 478,706, dated July 12, 1892.

Application filed April 25, 1891. Serial No. 390,480. (No model.)

*To all whom it may concern:*

Be it known that I, CHARLES NELSON, a citizen of the United States, residing at Axtell, in the county of Kearney and State of Nebraska, have invented certain new and useful Improvements in Wagon-Boxes; and I do hereby declare the following to be a full, clear, and exact description of the invention, such as will enable others skilled in the art to which it appertains to make and use the same.

The invention relates to wagon-boxes for farm-wagons; and it consists in an improved construction whereby the wagon may be adapted for various purposes, as hereinafter described and claimed.

Figure 1:
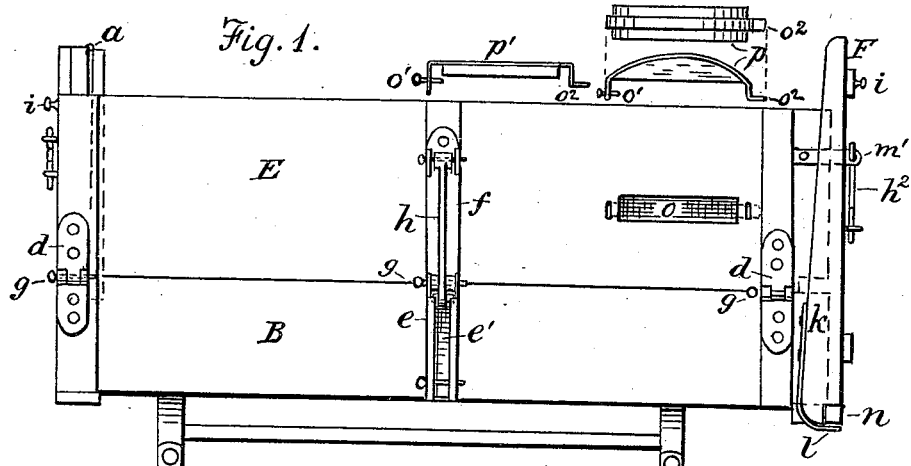
Figure 2:
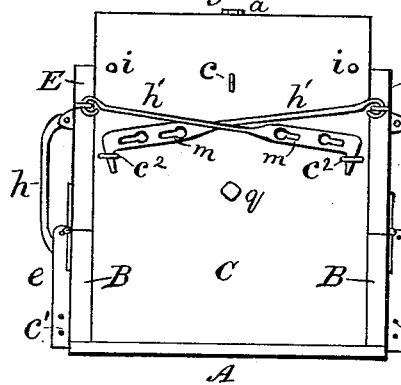
Figure 3:
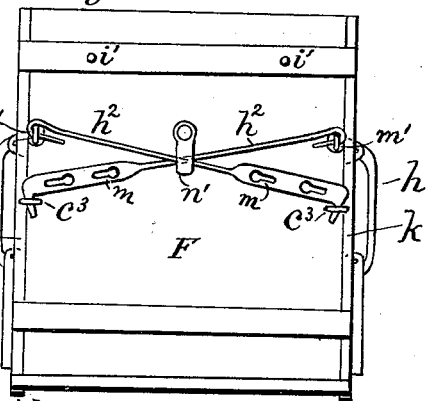
Figure 15:
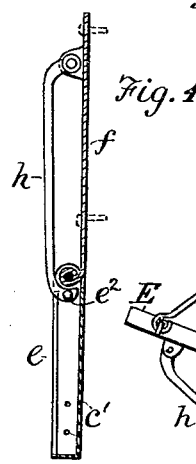
Figure 4:
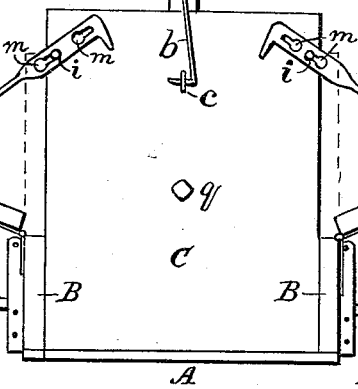
Figure 16:
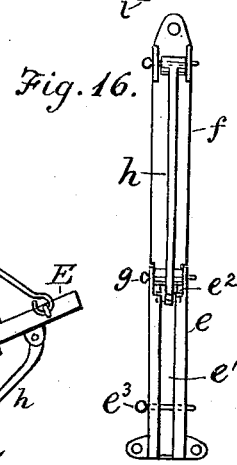
Figure 11:
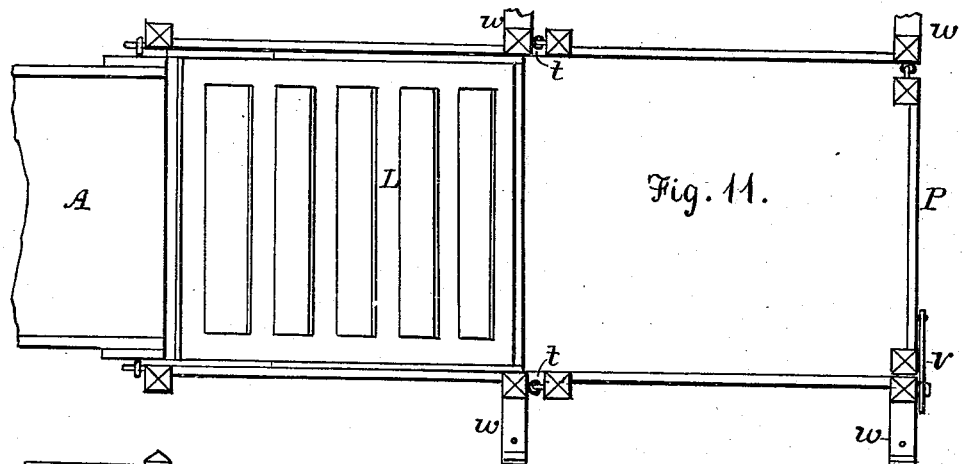
Figure 12:
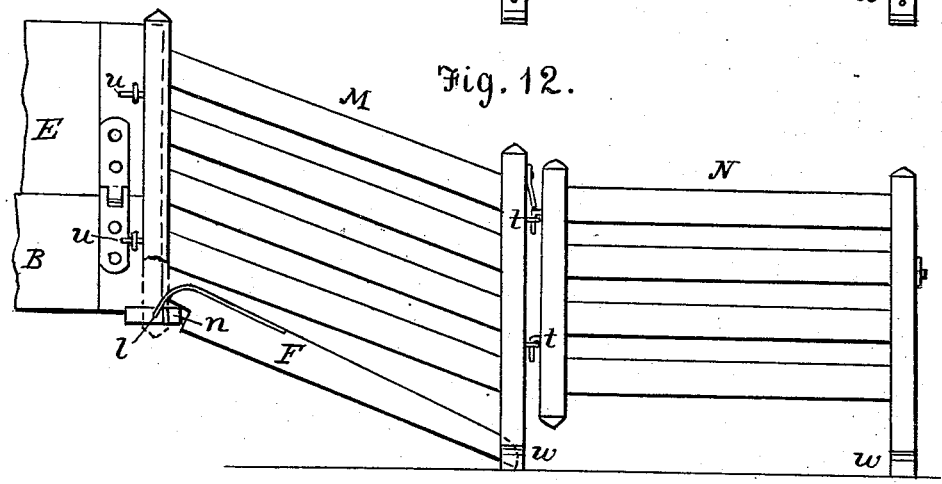
Figure 13:
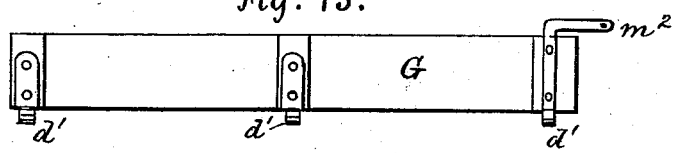
Figure 14:
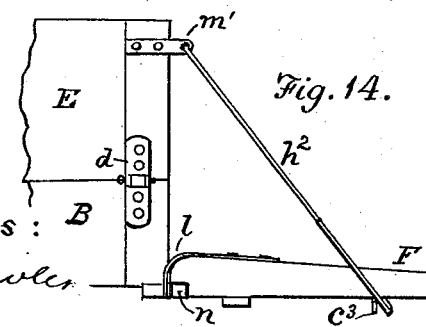

In the accompanying drawings, Figure 1 represents a side view of a wagon-box constructed according to my invention. Fig. 2 is a front view of the same. Fig. 3 is a rear view of the same. Fig. 4 represents the device adjusted for a hay-rack. Figs. 5 and 6 represent the adjustment for a header-box. Figs. 7 to 10 illustrate certain details. Figs. 11 and 12 represent an adjustment for loading stock. Fig. 13 is a side view of a board to be substituted for the side-board. Fig. 14 shows a horizontal adjustment of the end-gate. Figs. 15 and 16 illustrate the adjustable braces connected with the sides of the wagon-box.

A designates the floor of the wagon-box, to which are permanently secured the side pieces B and the front end piece C, the latter being much higher than the side pieces B, as shown.

To the front end piece C is secured a standard D, which is in two parts connected by a hinge $a$, so that it may be turned down when it is not in use. When the standard D is raised, it may be secured by a hook $b$ and staple $c$.

To the upper edges of the sides B are removably secured the side-boards E by the hinges $d$, which form detachable connections of the parts and allow the side-boards to be turned down to an inclined or to a horizontal position, as hereinafter set forth.

The sides of the wagon-box are provided with adjustable braces $h$, each of which is pivotally connected at its upper end with a plate $f$, made fast to a side-board E and having a hinge connection with a retaining-guide $e$, made fast to a side piece B below. The guide $e$ has a vertical groove $e'$ formed by two flanges, which are bent somewhat toward each other, and the lower end of the brace $h$ is bent and has an enlargement or lateral projection $e^2$, so that when it is inserted between the flanges it is loosely retained and has a vertical movement in the guide when the side-board E is turned downward or raised. The guides $e$ have perforations, as seen at $c'$, in which pins $e^3$ may be inserted to adjust the braces $h$ higher or lower in the guides in adjusting the side-boards in position, as desired. The pins $g$ in the hinge connections of the parts B and E may be withdrawn for the purpose of detaching the side-boards, as desired. The side-boards E may be secured in their vertical or closed position by means of the hook-rods $h'$ and $h^2$, two rods $h'$ being connected with said boards at the front and two rods $h^2$ being connected with said boards at the rear end of the wagon-box. When the side-boards are closed in their vertical position, the hook-rods $h'$ extend across each other and hook in staples $c^2$ on the front of the wagon-box, and the rods $h^2$ extend across each other against the rear end-gate F and hook in staples $c^3$ on the end-gate. (See Figs. 2 and 3.) When the side-boards are adjusted to either a laterally-inclined or a horizontal position, the hook-rods are connected with fixed pins $i$ on the front and rear ends of the wagon-box, said rods having perforations $m$ to receive said pins. Several perforations may be made in each rod for different adjustments of the side-boards in position. The rear end-gate F is removable and is provided with cleats $k$ at its edges, which inclose the rear ends of the side-boards, the lower ends of said cleats being notched and provided with spring-hooks $l$ for connection with an outside cross-piece $n$ at the bottom. The hook-rods $h^2$, which secure the end-gate F in place, are detachably connected with the eye-bolts or strips $m'$, fastened to the side-boards E and extending through apertures in the end-gate, the said rods being readily detached from eyebolts $m'$ to remove the end-gate for any purpose or to adjust it to different positions. When the rods $h^2$ extend across each other and are hooked in staples $c^3$, they may be secured by a turn-button $n'$.

Each of the side-boards E has an opening $o$ made therein in position to receive a hind wheel of the wagon when the side-boards are turned down to their level position. A concave cover $p$ is provided for the opening $o$ and forms a shield for the hind wheel. The said shield is secured by a catch $o^2$ on one end and a perforated tongue on the other end, the said tongue and catch being passed through holes at the extremities of the opening $o$, and a pin $o'$ being passed through the tongue. When the side-boards are in their vertical position, the opening $o$ may be closed by a flat cover $p'$, provided with a similar tongue and catch.

The end-gate F may be adjusted to a horizontal position for the purpose of unloading ear-corn or other articles which may be unloaded with a shovel, the hook-rods $h^2$ being first detached and connected with the eye-bolts $m'$ and the hooks made to connect with the end-gate, as seen in Fig. 15.

To adjust the wagon-box for a hay-rack, the side-boards E are turned down to either a laterally-inclined or to a level position. The detachable hook-rods $h'$ are connected with the pins $i$ on the front of the wagon, and the hook-rods $h^2$ are connected with eyebolts $m'$ and with the pins $i'$ on the end-gate F, the latter being in its vertical position. The standard D is also secured in its vertical position. The rear ends of the side-boards E are released from the cleats $k$ of the end-gate by detaching the rods $h^2$ from the eyebolts $m'$ and then turning the end-gate backward slightly, when the boards E may be turned down, and the rods $h^2$ may be again connected with the bolts $m'$ and with the pins $i$ on the end-gate.

When it is desired to adjust the wagon-box with one side higher than the other, as when husking corn in the field, one of the side-boards E is removed, and a narrower board G may be substituted. The board G is provided with parts of hinges $d'$ and an eyebolt $m^2$, so that it may be connected with one of the side pieces B and with the end-gate.

To adjust the wagon-box to form a header-box for use in connection with a harvesting-machine which cuts the heads from the grain, the standard D is adjusted in its vertical position and the side-boards E in their level position. The end-gate F is removed, and two filling-pieces I are placed one at the inner edge of each of the side-boards to close the openings at the hinges. A front board H, which narrows from one end to the other, is then placed across the box close against the front end piece C and secured thereto by a bolt at $q$ and another end-board H′, mainly corresponding in form with the board H, but having an extension J at its lower edge, is placed at the rear end of the box with the said extension fitting therein. A side-board K is then secured to the wide ends of the boards H H′ by means of fixed keys and pins $r$ to form the higher side of the header-box, and a narrower side-board K′ is connected with the narrow ends of the boards H H′ by pins $s$. The hook-rods $h'$ are connected with pins $i$, and the rods $h^2$ are put in connection with the pins $s'$, on the rear end-board H′.

When grain is being cut by a machine termed a "header," the falling heads are usually caught by a carrier provided for the purpose and conveyed to an elevator by which they are carried upward and cast into the header-box. While the header, carrier, and elevator are in operation the wagon is in position with the low side of the header-box to the elevator, the latter extending over it, so that the grain falls therefrom into the box. When the box is filled, the wagon is driven off to be unloaded, and another wagon with a box of similar construction may be driven in position to receive another load of grain.

The wagon-box, with certain attachments, may be adjusted for loading live stock—such as may be carried in a wagon—by adjusting the parts, as shown in Fig. 1, except the end-gate F, which is turned down to form an inclined plane, with one end resting on the ground and the other end with hooks $l$, connected with the cleat or cross-piece $n$. A frame L, having cross-slats, is then laid on the inclined plane, and two inclined frames or sections of railing M are connected with the rear end of the wagon-box by means of fixed pins $u$, which enter eyes or staples fixed to the wagon-box. Two sections of railing N are then connected with the sections M by means of the hooks and staples seen at $t$. Each section of railing is provided at one end with a perforated foot $w$ to rest on the ground, to which it may be secured by a pin. A gate P may be detachably connected with one of the sections N by hooks and staples and the entrance may be closed by said gate, the latter being provided with a latch $v$.

I claim—

1. The combination, with the fixed front and side pieces and end-gate of a wagon-box, of two side-boards hinged to said side pieces and hook-rods provided with perforations $m$, two of which rods are connected with the front and two with the rear ends of said side-boards, said hook-rods being constructed to secure said side-boards in their vertical or closed positions and also to adjust said side-boards in their inclined and level positions by connection with fixed pins $i$ on the ends of the box, substantially as set forth and described.

2. The combination, with the front end piece of a wagon-box, of a standard made in two parts which are coupled together and provided with a hook for securing said standard in an upright position, substantially as set forth and described.

3. The combination, with the sides and floor of a wagon-box provided with eyebolts $m'$ and a cross-piece $n$, of a removable end-gate F, perforated to receive said eyebolts and provided with notched cleats and hooks for connection with said cross-piece, and hook-rods $h^2$, whereby said end-gate may be secured either in a vertical or a horizontal position, substantially as set forth and described.

4. The combination, with the fixed front and side pieces of a wagon-box, of the hinged side-boards E, tapering end-boards H and H', the latter being provided with a downward extension to fit in the rear end of said box, the side-boards K and K', corresponding, respectively, in width with the wide and narrow ends of the boards H H', hook-rods $h'$ and $h^2$, and devices, substantially as described, for securing the parts in place, as herein specified.

In testimony whereof I have affixed my signature in presence of two witnesses.

CHARLES NELSON.

Witnesses:
L. M. COPELAND,
V. ABRAHAMSON.